United States Patent

Williams et al.

[11] Patent Number: 5,165,487
[45] Date of Patent: Nov. 24, 1992

[54] DEEP RIPPER POINT

[75] Inventors: Robert A. Williams; William A. Bell, both of Garden City, Kans.

[73] Assignee: Acra-Plant, Inc., Garden City, Kans.

[21] Appl. No.: 669,753

[22] Filed: Mar. 15, 1991

[51] Int. Cl.$^5$ ............... A01B 23/02; A01B 13/08
[52] U.S. Cl. ................. 172/699; 172/772.5; 172/713
[58] Field of Search .............. 111/123, 156, 124, 152, 111/120, 149; 172/719, 772, 772.5, 699, 700, 762, 765, 713, 747; 405/180, 181

[56] References Cited

U.S. PATENT DOCUMENTS

| | | | |
|---|---|---|---|
| 3,002,574 | 10/1961 | Padrick | 172/699 |
| 3,006,089 | 10/1961 | Johnson | 172/699 X |
| 3,202,222 | 8/1965 | Norris | 172/719 X |
| 3,959,901 | 6/1976 | Klett | 172/713 X |
| 4,013,130 | 3/1977 | Wirt et al. | 172/713 X |
| 4,033,271 | 7/1977 | Williams et al. | 111/123 |
| 4,127,073 | 11/1978 | Blair | 111/156 X |
| 4,132,181 | 1/1979 | Smith et al. | 111/123 |
| 4,446,927 | 5/1984 | Robertson | 172/719 X |
| 4,748,754 | 6/1988 | Schwappach | 172/713 X |
| 4,773,340 | 9/1988 | Williams et al. | 172/699 X |
| 4,799,823 | 1/1989 | Williams | 172/772 X |

OTHER PUBLICATIONS

"V-Model Deep-Till", Sales Brochure, Wetherell Mfg. Co., (date unknown).

Primary Examiner—Randolph A. Reese
Assistant Examiner—Jeffrey L. Thompson
Attorney, Agent, or Firm—Hovey, Williams, Timmons & Collins

[57] ABSTRACT

The point is adapted to fit onto the forwardly projecting mounting wedge of a tillage shank and has a downwardly and forwardly inclined, elongated crown provided with a transverse, sharpened tip at its lower front end. An underslung transverse wall looped under the crown at the front end of the point defines a rearwardly opening socket that matingly receives the apex of the mounting wedge of the shank, and depending sidewalls on the crown adjacent its opposite lateral edges rearwardly of the underslung wall serve to present a protective trough on the underside of the crown that matingly receives the upper surface of the mounting wedge so as to protectively cover otherwise exposed side portions of the wedge and thus shield such areas from exposure of abrasive soils. Two alternate embodiments are disclosed, one of which has lateral side edges of the crown intersecting cleanly with upright surface of the underslung wall and the sidewalls, and the other of which has side edge of the crown overhanging such structures and provided with a certain vertical thickness dimension.

6 Claims, 3 Drawing Sheets

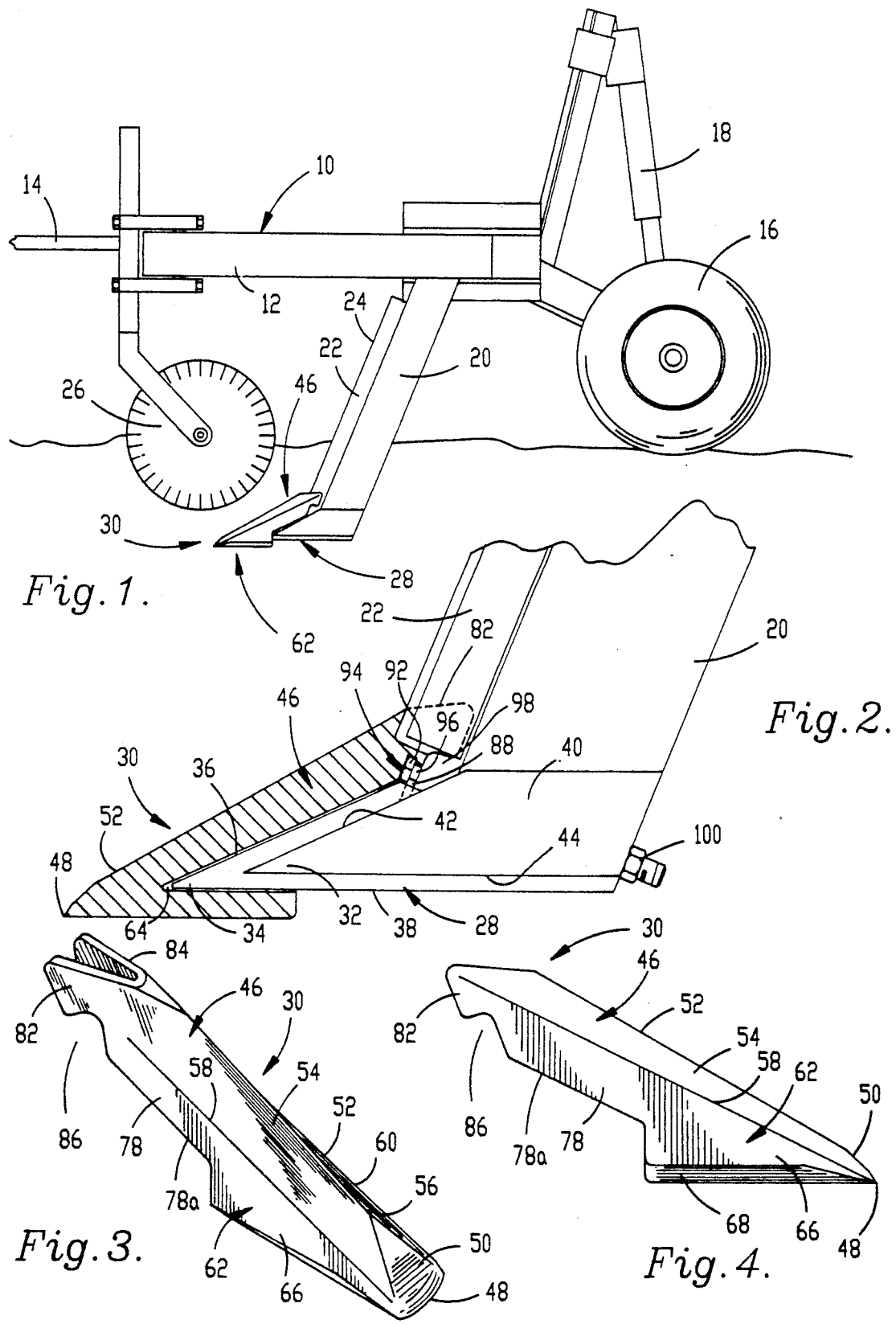

DEEP RIPPER POINT

TECHNICAL FIELD

This invention relates to tillage equipment and, more particularly, to an improved deep tillage ripper point for use with a particular type and configuration of mounting shank.

BACKGROUND

A commercially available deep tillage implement uses a generally upright, slightly downwardly and forwardly angled blade shank to cut slices in the soil as the implement is advanced. A ripper point is mounted on a forwardly projecting, generally wedge-shaped mount at the bottom of the blade and presents a less steeply inclined working surface that produces a fracturing action in the soil forwardly of the ripper point and above the same as the implement moves forward. However, the point is subjected to a powerful abrasive action as it moves through the soil and must, therefore, be periodically replaced. Furthermore, because of the current design of the point, the mounting wedge which carries the point is itself subjected to significant and rapid wear.

SUMMARY OF THE PRESENT INVENTION

Accordingly, it is an important object of the present invention to provide an improved replaceable deep ripper point which is designed to fit onto the mounting wedge of the conventional blade shank as aforesaid, but which has improved wear characteristics, both for itself and for the adjacent portions of the mounting wedge to which it is secured.

In carrying out the foregoing object, the present invention contemplates providing the point with an elongated body that is usually downwardly and forwardly inclined during use. A long, fore-and-aft extending crown on the point has an underslung, transverse wall adjacent the lower front end that defines a receiving socket for the apex of the mounting wedge of the shank. Thus, when the point is mounted on the wedge, the crown overlies the upper, downwardly and forwardly directed surface of the mounting wedge while the underslung wall is looped beneath the apex of the wedge. In order to protect side portions of the mounting wedge, the crown has rigid, fore-and-aft extending sidewalls that depend from opposite side edges of the crown to define an inverted trough which overlies the top surface of the mounting wedge and protectively covers otherwise exposed sides of the mounting wedge. In a spring version of the point, intended for shallower tillage than a fall version, the opposite side edges of the crown intersect cleanly with the sidewalls and terminate along such intersection, while in the fall point designed for deeper soil penetration, the side edges of the crown overhang the sidewalls and present a marginal edge of definite thickness.

BRIEF DESCRIPTION OF THE DRAWINGS

FIG. 1 is a schematic elevational view of a tillage implement employing a replaceable point in accordance with the principles of the present invention;

FIG. 2 is an enlarged, fragmentary, longitudinal cross-sectional view of the point with the shank and mounting wedge thereof illustrated in elevation;

FIG. 3 is a right front perspective view of the point;

FIG. 4 is a right side elevational view thereof;

DETAILED DESCRIPTION

Figure 5:
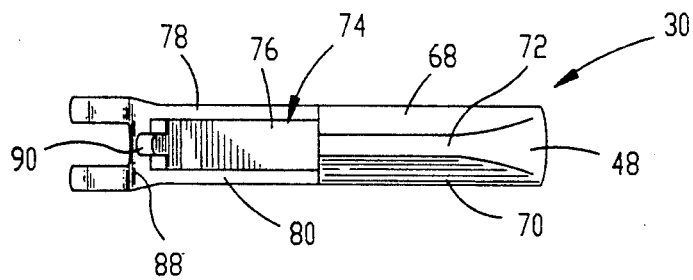
FIG. 5 is a bottom plan view thereof.
Figure 6:
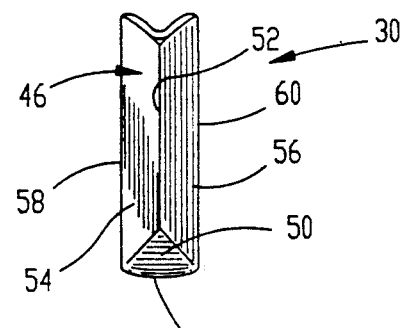
FIG. 6 is a front elevational view thereof.
Figure 7:
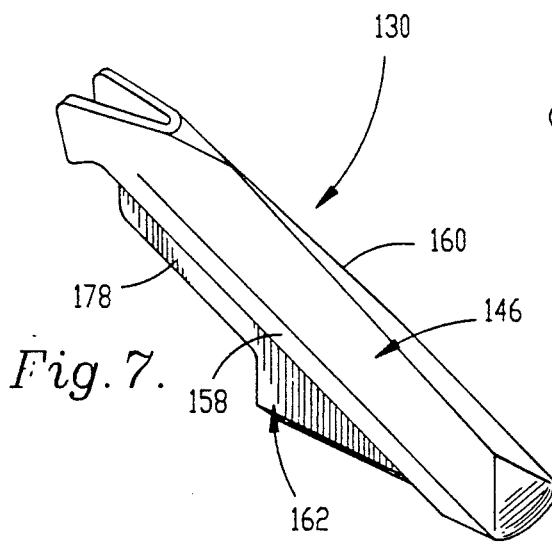
FIG. 7 is a right front perspective view of a second embodiment of the present invention.
Figure 8:
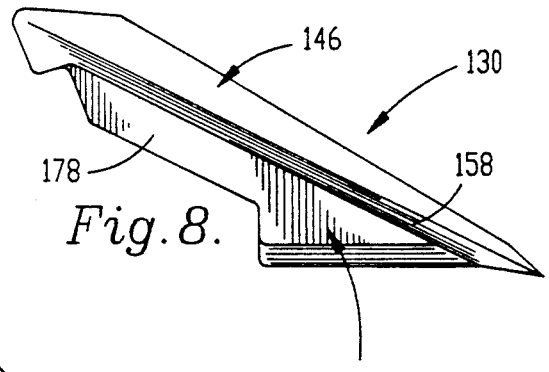
FIG. 8 is a right side elevational view of the embodiment of FIG. 7.
Figure 9:
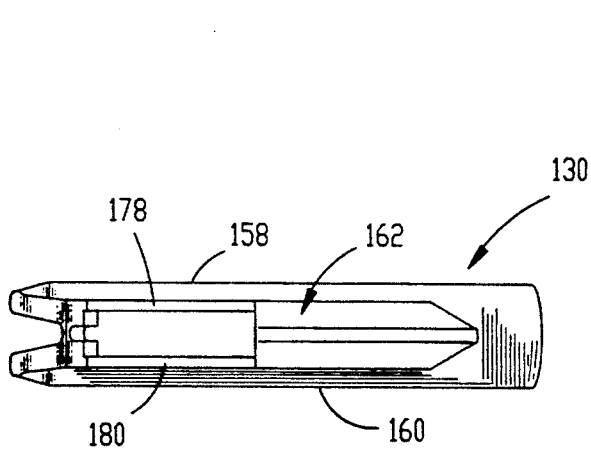
FIG. 9 is a bottom plan view of the point of FIG. 7.
Figure 10:
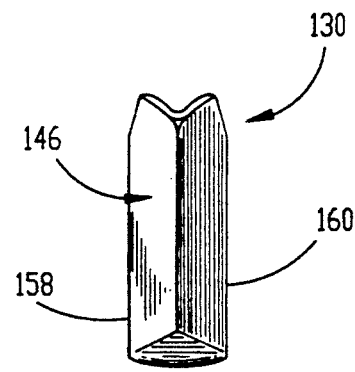
FIG. 10 is a front elevational view of the point of FIG. 7.

The implement 10 has a frame 12 that is adapted to be coupled with a towing vehicle (not shown) by a tongue 14 for movement across a field to be worked. Ground wheels 16 at the rear of the frame 12 support the implement for travel and are provided with depth control hydraulic cylinders 18 to raise or lower the frame 12.

The frame 12 has attached to it a number of downwardly and forwardly extending shanks in the nature of blades 20, each of which is provided with a long bar 22 along the leading vertical face thereof which is beveled to present a relatively sharp leading edge 24. Slightly ahead of each blade 20 is a coulter 26 which is attached to the frame 12 in alignment with the blade 20 for severing crop residue and preparing an opening slit in the soil for the oncoming blade 20. In one preferred form, the implement 10 may comprise a machine manufactured by Thurston Manufacturing Company of Thurston, Nebr., and marketed under the trade designation "Sub-Tiller II".

Figure 12:
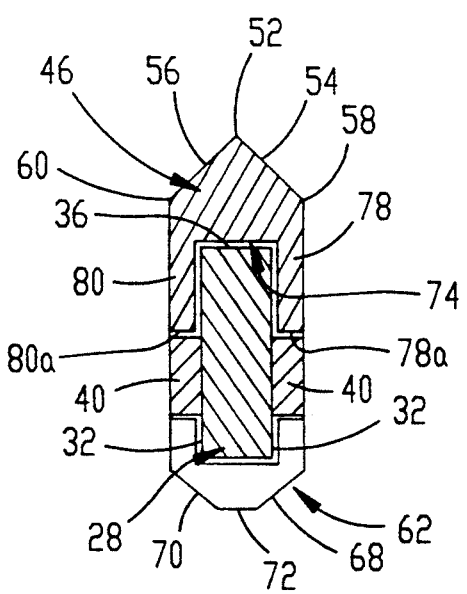
FIG. 12 is a vertical, cross-sectional view through the mounted point of FIG. 11 taken substantially along line 12—12 of FIG. 11.

The blade 20 has a forwardly projecting mounting wedge broadly denoted by the numeral 28 at its lower end which receives a replaceable tillage point broadly denoted by the numeral 30. The wedge 28 has a pair of opposite, flat sides 32 (FIGS. 2 and 12), a leading apex 34, and rearwardly diverging upper and lower flat surfaces 36 and 38. A pair of generally triangular wear plates 40 are welded onto opposite sides 32 of the wedge 28 to improve the wear characteristics of the blade 20, each of such wear plates 40 having a downwardly and forwardly inclined front edge 42 that is set back from but is generally parallel to the top surface 36 of the wedge 28, and a lower rearwardly extending edge 44 which is spaced above but extends parallel to the lower flat surface 38 of the wedge 28.

The point 30 comprises an elongated, unitary body having a downwardly and forwardly inclined, elongated crown 46 which terminates at its front end in a transversely extending, beveled tip 48. The tip 48 corresponds in width to the width of the crown 46 and is relatively sharp to facilitate movement through the soil, such sharpness being contributed in part by a generally triangular front bevel 50 on the crown 46 leading rearwardly from the tip 48. The crown 46 has an uppermost longitudinal edge 52 that extends from the rear termination of the bevel 50 to the rear end of the crown 46, such edge 52 being presented by a pair of oppositely transversely inclined, flat faces 54 and 56 which extend the full length of the crown 46 and intersect with the bevel 50 adjacent the lower front end of the point. The crown 46 also has a pair of opposite, fore-and-aft lateral edges 58 and 60 that extend generally from the tip 48 upwardly and rearwardly to a point adjacent the rear end of the tool. As can be seen perhaps best in FIG. 4, the side edges 58,60 and the upper edge 52 diverge slightly rather than remain in parallelism with one another.

Figure 11:
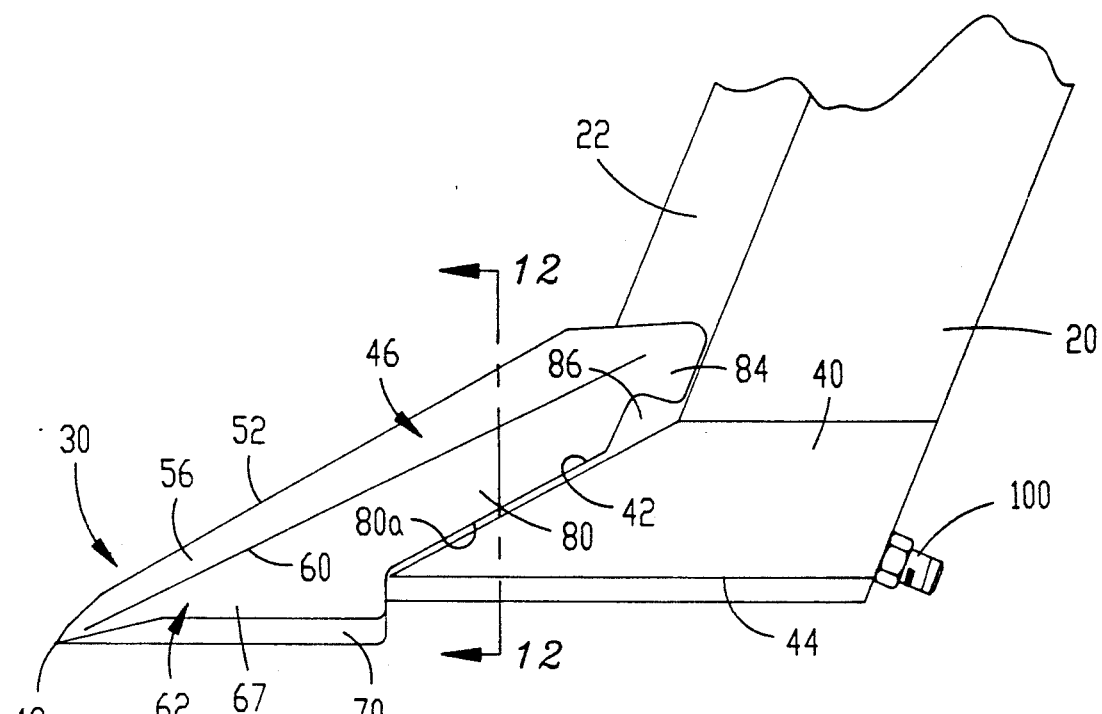
FIG. 11 is a fragmentary, side elevational view of the point of FIGS. 1–6 installed on a shank with all components shown in elevation.

The point also includes an underslung rigid wall broadly denoted by the numeral 62 which is integrally formed with the crown 46 and which is looped transversely under the latter in the front half of the tool, extending between the side edges 58,60 and the tip 48. The underslung wall 62 thus defines an internal, rearwardly opening, receiving socket 64 (FIG. 2) which is complementally configured with respect to the mounting wedge 28 so as to snugly receive the apex 34 thereof. The wall 62 includes opposite side panels 66 and 67 (FIGS. 3, 4, and 11), a pair of downwardly converging, fore-and-aft extending lower faces 68 and 70 extending from the tip 48 to the rear extremity of the underslung wall 62, and a bottom runner 72 (FIG. 5) that likewise leads rearwardly from the tip 48 to the rear extremity of the underslung wall 62. The runner 72 extends rearwardly from the tip 48 at an acute angle to the longitudinal axis of the crown 46 and is intended to be disposed in a substantially horizontal condition as the point 30 is worked in the soil.

An inverted mounting trough 74 is integrally formed in the body of the point 30 rearwardly of the underslung wall 62, a plan view of which is illustrated in FIG. 5. The trough 74 is presented by the flat underside 76 of the crown 46 and also by a pair of opposite sidewalls 78 and 80 that depend from the crown 46 along its opposite side edges 58 and 60. The sidewalls 78 and 80 merge with the rear extremity of the underslung wall 62 at the front and intersect cleanly with the edges 58 and 60 along their upper extremities. The fore-and-aft length of the sidewalls 78,80 is slightly greater than the corresponding fore-and-aft length of the underslung wall 62, but both of the sidewalls 78,80 have substantially shorter vertical dimensions than the sidewall 62. The lower extremity 78a of the sidewall 78 extends parallel to the side edge 58 of the crown 46, while the corresponding lower edge extremity 80a of the sidewall 80 extends parallel to its corresponding crown side edge 60.

The point is of constant width front to rear. Adjacent its upper rear end, the crown 46 splits to present a pair of ears 82 and 84 that straddle the lower end of the bar 22 on blade 20 when the point 30 is installed on the mounting wedge 28. A downwardly opening notch 86 is provided in each sidewall 78,80 just ahead of the ears 82 and 84.

The upper rear end of the trough 74 presents a downwardly and forwardly inclined backwall 88 (FIGS. 2 and 5) having a bolt receiving notch 90 therein. The backwall 88 and notch 90 assist in providing a means for fastening the point 30 onto the wedge 28, as will now be discussed.

OPERATION

When the point 30 is placed on the mounting wedge 28, the apex 34 of the wedge 28 slips into the socket 64 and the crown 46 comes into overlying relationship with the top surface 36 of the wedge 28. The head 92 of a loosened bolt 94 may be captured behind the backwall 88 while the shank 96 of the bolt 94 passes through the notch 90 and through an integral boss 98 on the front of the blade 20 just above the mounting wedge 28. A bore (not shown) angled downwardly and rearwardly through the blade 20 permits the bolt 94 to pass completely through the blade 20 so the shank 96 projects rearwardly beyond the shank 20, as illustrated in FIG. 2. A nut 100, as well as lock washers and the like (not shown), may be used to tighten the bolt head 92 against the backwall 88 and thus draw the point 30 progressively tighter and tighter onto the wedge 28 until the desired level of security is obtained.

As the implement 10 is advanced, the point 30 fractures the subsoil ahead of it and above it thereby increasing moisture retention in the soil and enhancing root growth. Although the point 30 is exposed to powerful wearing forces as it moves through the soil, it will be appreciated that the protective sidewalls 78 and 80 overlie a significant portion of the opposite flat sides 32 of the mounting wedge 28, thereby guarding against untoward wear of the wedge 28 in such areas. Because of the presence of the sidewalls 78 and 80, the soil flow is such that there tends to be less abrasive wear of the sides of the wedge 28 in the area of the wear plates 40, thus permitting the wear plates 40 even to be eliminated in some instances. The point 30 can easily be replaced if such becomes necessary by simply loosening the nut 100 and removing it from the bolt 94, allowing the point 30 to be completely removed from mounting wedge 28 for the installation of a new such point.

ALTERNATIVE EMBODIMENT

The point 130 illustrated in FIGS. 7-10 is substantially similar to the point 30 except that it is normally larger and more massive than the point 30 for deeper tillage operations, particularly during the fall season, and in certain other structural and appearance respects. In contrast to the point 30, the crown 146 has opposite lateral edges 158 and 160 that project outwardly beyond and overhang the sidewalls 178,180 and the underslung transverse wall 162.

Moreover, the side edges 158 and 160 have a measurable thickness in the vertical direction in contrast to the point 30 where the edges 58 and 60 are merely a line of intersection between the faces 54,56, the underslung wall 62, and the sidewalls 78,80. In other respects, the two points are very similar and their function and operation is substantially the same as they move through the soil.

Preferably, the points 30 and 130 are cast from a chrome alloy to provide enhanced wear characteristics, as is well understood by those skilled in the art. Such alloy has been available for many years from Acra-Plant, Inc., the assignee of the present invention, in a variety of tillage and seed bed preparation products sold under the trademrk "Acra-Tuff".

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of their invention as pertains to any apparatus not materially departing from but outside the literal scope of the invention as set out in the following claims.

We claim:

1. For use in combination with the shank of a tillage implement having a generally upright blade and a forwardly projecting mounting wedge at the lower end of the blade, said wedge being provided with a forwardly disposed apex, upper and lower surfaces diverging rearwardly from the apex, and opposite upright sides, a replacable tillage point including:

- an elongated, unitary body adapted to be mounted on the wedge in such a manner that the longitudinal axis of the body is inclined upwardly and rearwardly during use,
- said body including an inclined, elongated crown which overlies the upper surface of the wedge when the body is installed thereon and which terminates forwardly in a normally lower front tip and rearwardly in a normally upper rear end,
- said crown having an upwardly and rearwardly inclined, substantially straight top edge and a pair of opposite, flat faces diverging laterally outwardly from said top edge,
- said body further including an underslung wall looped transversely beneath said crown generally rearwardly adjacent the tip of the crown to define a rearwardly opening socket configured to matingly receive the apex of the mounting wedge,
- said underslung wall extending rearwardly from said tip of the crown at an angle to the crown and terminating in a transverse rear edge spaced below and forwardly from the upper rear end of the crown,
- said crown having an inverted generally transversely U-shaped trough on an underside thereof between the socket and the upper rear end of the crown,
- said trough including a pair of laterally spaced, flat, upright, parallel sidewalls depending from the crown and merging integrally at their forward ends with said underslung wall so that the bight of the trough lies against the top surface of the wedge and the sidewalls of the trough protectively overlap and cover a portion of the opposite sides of the wedge when the body is installed on the wedge; and
- fastening means adjacent said upper end of the crown for releasably securing the body on the mounting wedge and progressively drawing the socket onto the apex of the wedge,
- said body having a lower, rear cutout which produces a stepped profile along the bottom of the body when viewed in side elevation,
- the stepped bottom profile of the body having a forward, normally generally horizontal stretch defined by the underslung wall, an intermediate, normally generally vertical stretch at the front of the cutout formed by the rear edge of the underslung wall and an entrance of the socket, and a rear, normally upwardly and rearwardly inclined stretch at the top of the cutout formed by a bottom edge of a sidewall of the trough,
- said crown having a pair of straight, laterally spaced, opposite, longitudinally extending side edges leading upwardly and rearwardly from the tip of the body to said rear end of the body,
- said bottom edges of the sidewalls extending at least generally parallel to said side edges of the crown.

2. A replaceable tillage point as claimed in claim 1,
- said sidewalls of the trough each extending continuously rearwardly from said underslung wall to a downwardly opening notch located forwardly of said upper rear end of the crown.

3. A replaceable tillage point as claimed in claim 1,
- each of said side edges lying within the common upright plane of the respective sidewall of the trough and proximal portion of the underslung wall.

4. A replaceable tillage point as claimed in claim 1,
- said side edges overhanging and extending laterally outwardly beyond the respective sidewalls of the trough and proximal portions of the underslung wall.

5. A replaceable tillage point as claimed in claim 4,
- each side edge of said crown including a flat edge surface lying in a plane parallel to but spaced outboard of the common plane of the respective sidewall of the trough and proximal portion of the underslung wall.

6. A replaceable tillage point as claimed in claim 5,
- said underslung wall being spaced rearwardly from the tip of the crown and laterally inboard of said side edges of the crown.

* * * * *